US009219393B2

(12) United States Patent
Karlsson et al.

(10) Patent No.: US 9,219,393 B2
(45) Date of Patent: Dec. 22, 2015

(54) ELECTRIC DRIVE SYSTEM

(75) Inventors: Pontus Karlsson, Örnsköldsvik (SE);
Henrik Kjellman, Upplands Väsby (SE);
Viktor Lassila, Arnäsvall (SE)

(73) Assignee: BAE SYSTEMS HÄGGLUNDS AKTIEBOLAG, Örnsköldsvik (SE)

( * ) Notice: Subject to any disclaimer, the term of this patent is extended or adjusted under 35 U.S.C. 154(b) by 645 days.

(21) Appl. No.: 13/511,352

(22) PCT Filed: Oct. 14, 2010

(86) PCT No.: PCT/SE2010/051109
§ 371 (c)(1),
(2), (4) Date: Jul. 30, 2012

(87) PCT Pub. No.: WO2011/065888
PCT Pub. Date: Jun. 3, 2011

(65) Prior Publication Data
US 2012/0283061 A1    Nov. 8, 2012

(30) Foreign Application Priority Data
Nov. 24, 2009  (SE) .................... 0950890-4

(51) Int. Cl.
*F16H 37/08* (2006.01)
*H02K 7/00* (2006.01)
(Continued)

(52) U.S. Cl.
CPC ...... *H02K 7/006* (2013.01); *B60K 1/00* (2013.01); *B60K 17/04* (2013.01); *F16H 48/10* (2013.01);
(Continued)

(58) Field of Classification Search
CPC ........... B60K 2001/001; B60K 17/046; B60K 17/04; F16H 2048/201; F16H 48/22; H02K 7/116; H02K 7/006

USPC .......................................... 475/149, 150, 154
See application file for complete search history.

(56) References Cited

U.S. PATENT DOCUMENTS 4,998,591 A  *  3/1991  Zaunberger .................. 180/6.44
5,631,511 A      5/1997  Schulmann et al.
(Continued)

FOREIGN PATENT DOCUMENTS

CN          1397103 A       2/2003
CN          1623265 A       6/2005
(Continued)

OTHER PUBLICATIONS

Office Action and Search Report received for Chinese Patent Application No. 2010800530648, issued on Jun. 30, 2014, 17 pages (8 pages of English Translation and 9 pages of Official Copy).
(Continued)

*Primary Examiner* — Justin Holmes
*Assistant Examiner* — Stacey Fluhart
(74) *Attorney, Agent, or Firm* — Morrison & Foerster LLP

(57) ABSTRACT

The present invention relates to an electric drive system comprising an electric motor (10) arranged to rotate a drive shaft (16); a drive planetary gear configuration (70) being in driving engagement with said drive shaft (16) and an output shaft (50) rotatable relative to said drive shaft (16); and means for providing change in rotational speed of said output shaft (50), wherein said rotational speed changing means (80, 82) are disposed on opposite sides of the motor (10) respectively. The present invention also relates to a motor driven unit, for example a motor vehicle.

16 Claims, 5 Drawing Sheets

(51) Int. Cl.
  *B60K 1/00* (2006.01)
  *B60K 17/04* (2006.01)
  *F16H 48/10* (2012.01)
  *F16H 48/22* (2006.01)
  *H02K 7/116* (2006.01)
  *H02K 16/00* (2006.01)

(52) U.S. Cl.
  CPC ............... *F16H 48/22* (2013.01); *H02K 7/116* (2013.01); *H02K 16/005* (2013.01); *B60K 2001/001* (2013.01)

(56) References Cited

U.S. PATENT DOCUMENTS

| | | | |
|---|---|---|---|
| 2003/0203782 A1* | 10/2003 | Casey et al. | 475/150 |
| 2004/0069542 A1 | 4/2004 | Simmons et al. | |
| 2004/0116228 A1* | 6/2004 | Thompson | 475/28 |
| 2005/0124451 A1* | 6/2005 | Morikawa | 475/6 |
| 2007/0117669 A1* | 5/2007 | Garnett et al. | 475/18 |
| 2007/0243965 A1 | 10/2007 | Ordo et al. | |
| 2009/0247346 A1* | 10/2009 | Hvolka et al. | 475/155 |
| 2011/0218070 A1* | 9/2011 | Mack et al. | 475/150 |

FOREIGN PATENT DOCUMENTS

| | | |
|---|---|---|
| CN | 201018351 Y | 2/2008 |
| DE | 19954590 A1 | 5/2001 |
| DE | 102004058984 A1 | 6/2006 |
| JP | 7-154942 A | 6/1995 |
| JP | 2001-121981 A | 5/2001 |
| JP | 2007-10093 A | 1/2007 |
| WO | 01/56138 A1 | 8/2001 |
| WO | 03/065546 A2 | 8/2003 |

OTHER PUBLICATIONS

International Search Report and Written Opinion received for PCT Patent Application No. PCT/SE2010/051109, mailed on Feb. 25, 2011, 13 pages.

Office Action Received for Australian Patent Application No. 2010325202, Issued on May 23, 2014, 3 pages.

Written Opinion received for PCT Patent Application No. PCT/SE2010/051109, mailed on Feb. 25, 2011, 7 pages.

International Preliminary Report on Patentability received for PCT Patent Application No. PCT/SE2010/051109, mailed on Jun. 7, 2012, 9 pages.

Written Opinion received for Singapore Patent Application No. 201203609-1, mailed on Aug. 8, 2013, 6 pages.

Office Action received for Japanese Patent Application No. 2012-539850, mailed on Sep. 30, 2014, 9 pages (6 pages of English Translation and 3 pages of Office Action).

* cited by examiner

ELECTRIC DRIVE SYSTEM

CROSS REFERENCE TO RELATED APPLICATIONS

This is a U.S. National Phase patent application of PCT/SE2010/051109, filed Oct. 14, 2010, which claims priority to the Swedish Patent Application No. 0950890-4, filed Nov. 24, 2009, each of which is hereby incorporated by reference in the present disclosure in its entirety.

TECHNICAL FIELD

The invention relates to an electric drive system according to the preamble of claim 1. The invention further relates to a motor driven unit, for example a motor vehicle.

BACKGROUND ART

It is known to use a pair of planetary gear configurations to provide differential drive respectively to a pair of output assemblies such as ground engaging wheels or a continuous belt or track, wherein the planetary gear configurations are arranged such that their respective sun gears are driven by a common drive member or shaft. The main drive source, typically a drive shaft propelled by an internal combustion engine, may be in mesh with a ring gear of one of the planetary gear configurations to provide direcitionality and gear reduction. Typically, the drive source includes a rotational axis perpendicularly disposed relative to the rotational axis of a driven axle, here referred to as a cross drive.

Such cross drive connections causes losses in the power transfer. An electrically driven power train where the drive source has been integrated into the differential reduces these losses and provides a more compact power train assembly.

US 2003/0203782 discloses a differential assembly including an electrically operated input device, a first planetary assembly and a second planetary assembly. The first planetary is in driving engagement with the input device and the first planetary is drivingly connected to a first output assembly. The second planetary assembly is in driving engagement with the first planetary assembly and is drivingly connected to a second output assembly wherein the first planetary assembly co-acts with the second planetary assembly to provide substantially the same torque to the first and second output assemblies.

The differential assembly according to US 2003/0203782 provides a relatively compact solution with a reduction in losses between the drive source and the final drive assemblies, and limits wheel slippage. Although the differential assembly according to US 2003/0203782 gives a compact solution, space in e.g. vehicles becomes more and more important and thus there is a need to further increase compactness in order to save space. Further said differential assembly may have disadvantages regarding ability to brake the differential due to e.g. ware of rotating components during braking and disadvantages due to energy losses during differential brake and thus reduction in efficiency.

OBJECTS OF THE INVENTION

An object of the present invention is to provide an electric drive system which facilitates compact construction, and exhibits a reduction in losses between drive source and output assembly when operated.

SUMMARY OF THE INVENTION

These and other objects, apparent from the following description, are achieved by an electric drive system and a motor driven unit, which are of the type stated by way of introduction and which in addition exhibits the features recited in the characterising clause of the appended independent claims. Preferred embodiments of the inventive electric drive system are defined in appended dependent claims.

Specifically an object of the invention is achieved by an electric drive system comprising an electric motor arranged to rotate a drive shaft; a drive planetary gear configuration being in driving engagement with said drive shaft and an output shaft rotatable relative to said drive shaft; and means for providing change in rotational speed of said output shaft, wherein said rotational speed changing means are disposed on opposite sides of the motor respectively.

Hereby a compact construction of the electric drive system is facilitated in that space of the planet gear set carrier of the planetary gear configuration may be avoided when engaging drive shaft and output shaft. Hereby the electric motor may be transversely arranged, thus avoiding losses between motor and output shaft due to cross drive when operated. Such an electric drive system may be used in a motor driven unit where no differential is needed such as e.g. a rail-mounted vehicle, providing a compact installation taking up little space.

According to an embodiment of the electric drive system said output shaft is substantially aligned with said drive shaft. Hereby a more compact system is facilitated in that the output shaft may be extended through the drive shaft. Cross drive is further avoided reducing losses between motor/drive shaft and a final drive.

According to an embodiment of the electric drive system said rotational speed changing means are operable between a first state in which the output shaft rotates with a slower rotational speed than the drive shaft, a second freewheeling state, a third state in which the output shaft and the drive shaft rotate with the same rotational speed, and a fourth fully lockup-state in which drive is prevented. Hereby an efficient drive due to efficient change of rotational speed is facilitated.

According to an embodiment of the electric drive system said rotational speed changing means comprises a first coupling assembly operable to engage the ring gear of the drive planetary gear configuration. Hereby efficient drive is facilitated.

According to an embodiment of the electric drive system said rotational speed changing means comprises a second coupling assembly operable to engage the drive shaft to the output shaft, said second coupling assembly being disposed on the opposite side of the motor to the first coupling assembly. Hereby efficient drive and a compact construction are facilitated.

According to an embodiment of the electric drive system said second coupling assembly comprises a shifting arm configuration. Hereby efficient drive and a compact construction are facilitated.

According to an embodiment of the electric drive system said second coupling assembly comprises a piston. Hereby efficient drive and a compact construction are facilitated.

According to an embodiment the electric drive system further comprises differential means comprising a first planetary gear being drivingly connected to a first output assembly; a second planetary gear configuration being in driving engagement with said first planetary gear configuration via said output shaft, said second planetary configuration being drivingly connected to a second output assembly; said motor being disposed between said first and second planetary gear configuration, said first planetary gear configuration being arranged to co-act with said second planetary gear configuration so as to provide a differential function. Hereby efficient drive and differential drive is facilitated.

According to an embodiment of the electric drive system said drive planetary gear configuration is disposed between said first and said second planetary gear configurations. Hereby a compact construction is facilitated.

According to an embodiment of the electric drive system the ring gears of the first and second planetary gear configurations are engaged via a reversing assembly for said differential function. This facilitates an efficient differential function with less ware on components of the differential means. Hereby the differential means may be fully locked, since the differential is separated from the drive shaft, and thus differential is separated from drive of the electric drive system. When the differential is locked the braking is provided on non-rotating components such that ware of components during operation is reduced. Further torque vectoring is facilitated.

According to an embodiment of the electric drive system said reversing assembly comprises a shaft configuration separated from said drive shaft. Hereby differential drive is separated from drive of the motor rendering the above mentioned advantages.

According to an embodiment of the electric drive system said reversing assembly comprises a rotational direction change configuration, connected to the ring gears of the first and second planetary gear configurations via said shaft configuration. This is an efficient way of providing said opposite rotation so as to provide an efficient differential function.

According to an embodiment the electric drive system further comprises control means being operable to engage said reversing assembly for controlling said differential. Hereby torque vectoring and/or fully locked and/or limited slip differential may be achieved.

According to an embodiment of the electric drive system said control means comprises a coupling configuration for braking said reversing assembly. Hereby fully locked or limited slip differential may be achieved.

According to an embodiment of the electric drive system said control means comprises a motor. Hereby torque vectoring may be achieved.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which.

DETAILED DESCRIPTION

Figure 1:
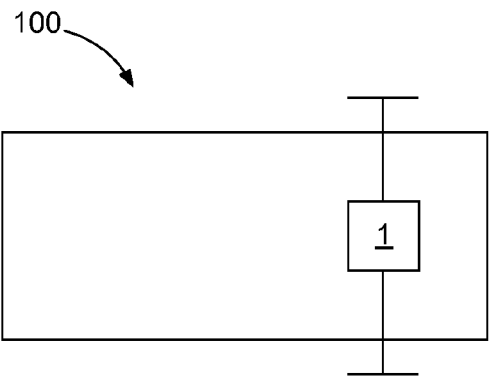
FIG. 1 schematically illustrates a motor driven unit.

FIG. 1 schematically illustrates a motor driven unit 100 comprising an electric drive system 1 according to the present invention. Said motor driven unit 100 may be constituted by a motor vehicle such as a working vehicle.

Figure 2:
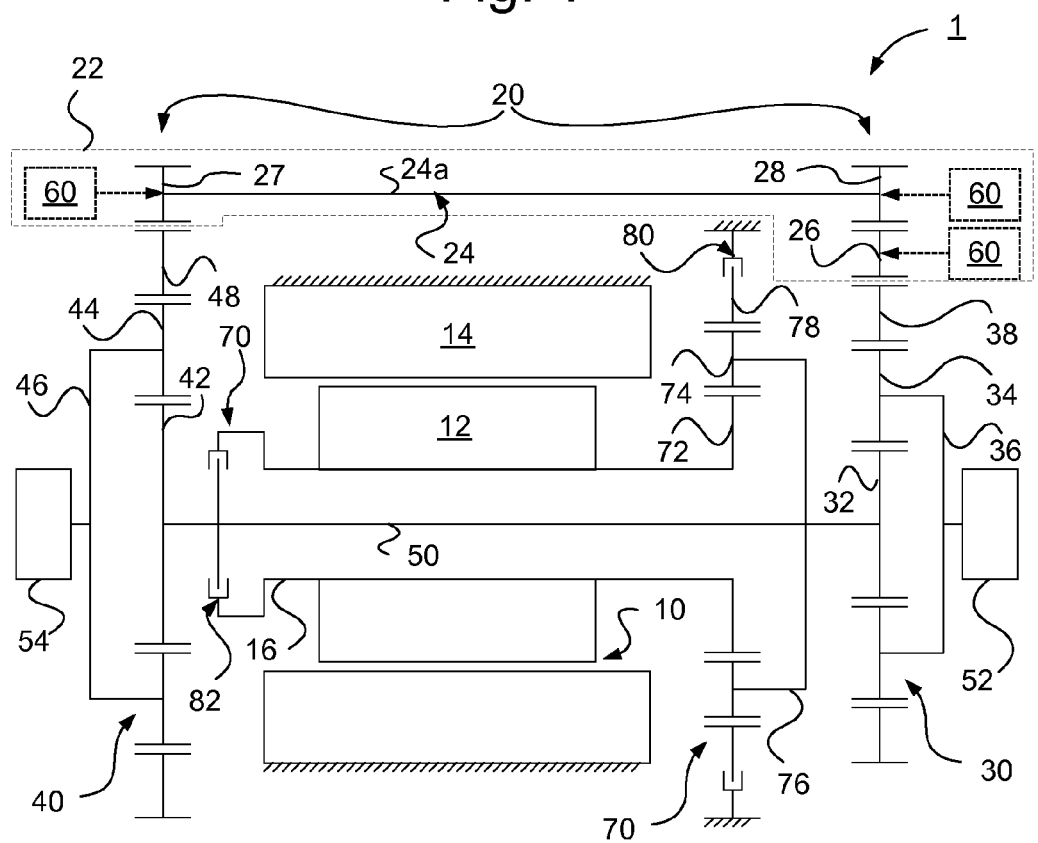
FIG. 2 schematically illustrates an electric drive system according to an embodiment of the present invention.

FIG. 2 schematically illustrates an electric drive system 1 according to an embodiment of the present invention. The electric drive system 1 comprises an electric motor 10 having a rotor 12 and a stator 14, said rotor 12 being connected to a drive shaft 16, said rotor 12 being arranged to rotate said drive shaft 16.

The electric drive system 1 further comprises differential means 20. Said differential means 20 comprises a first planetary gear configuration 30 and a second planetary gear configuration 40, said motor 10 being disposed between said first and second planetary gear configuration 30, 40.

The second planetary gear configuration 40 is in driving engagement with said first planetary gear configuration 30 via an output shaft 50 rotatable relative to and substantially aligned with said drive shaft 16.

The drive shaft 16 is according to an embodiment a hollow drive shaft 16 driven by the motor 10 and the output shaft 50 is extended through, and arranged to freely rotate within the hollow drive shaft 16.

The first planetary gear configuration 30 is drivingly connected to a first output assembly 52. The second planetary configuration is drivingly connected to a second output assembly 54. The first and second output assemblies 52, 54 is according to an embodiment final drive assemblies in driving engagement with wheel configurations, respectively. The wheel configurations may respectively propel ground engaging tires. The final drive assemblies each provide according to an embodiment a gear reduction between the differential means 20 and the respective wheel configuration. According to an embodiment each final drive assembly is a planetary gear configuration providing a desired gear reduction.

Alternatively the output assemblies 52, 54 are wheel configurations without final drive assembly, continuous track or belt configurations, with or without reduction gearing.

The first planetary gear configuration 30 includes a sun gear 32, a planet gear set 34 supported by a carrier 36, and a ring gear 38. In the first planetary gear configuration 30, the sun gear 32 of is in mesh with the planet gear set 34, and the planet gear set 34 is in mesh with the ring gear 38. The carrier 36 of the first planetary gear configuration 30 is arranged to transmit output torque to the first output assembly 52.

The second planetary gear configuration 40 includes a sun gear 42, a planet gear set 44 supported by a carrier 46, and a ring gear 48. In the second planetary gear configuration 40, the sun gear 42 is in mesh with the planet gear set 44, and the planet gear set 44 is in mesh with the ring gear 48. The carrier 46 of the second planetary gear configuration 40 is arranged to transmit output torque to the second output assembly 54

The second planetary gear configuration 40 is in driving engagement with said first planetary gear configuration 30 via the output shaft 50 such that the sun gear 32 of the first planetary gear configuration 30 is connected to the sun gear 42 of the second planetary gear configuration 40 through said output shaft 50.

The ratio represented by the number of teeth in the ring gear 38, 48 over the number of teeth in the sun gear 32, 42 is according to a preferred embodiment the same for the first and second planetary gear configurations 30, 40. Said ratio is according to an alternative embodiment different for the first and second planetary gear configurations. Said ratio is according to an embodiment in the range of 1:2 to 1:6, depending on application.

The differential means 20 further comprises a reversing assembly 22, wherein the ring gears 38, 48 of the first and second planetary gear configurations 30, 40 are engaged via said reversing assembly 22 for said differential function. Said reversing assembly 22 is separated from the drive shaft 16 and thus from drive of the electric drive system 1. Said reversing assembly 22 comprises a shaft configuration 24 separated from said drive shaft 16 and separated from said output shaft 50.

Said reversing assembly 22 comprises a rotational direction change configuration 25, connected to the ring gears 38, 48 of the first and second planetary gear configurations 30, 40 via said shaft configuration 24.

Said reversing assembly 22 is according to this embodiment connected between the ring gear 38 of the first planetary gear configuration 30 and the ring gear 48 of the second planetary gear configuration 40 such that when the ring gear 38 of the first gear configuration is allowed to rotate in one rotational direction with a certain rotational speed the ring gear 48 of the second planetary gear configuration 40 rotates in the opposite rotational direction with substantially the same rotational speed as the ring gear 38 of the first planetary gear configuration 30.

The ring gear 38, 48 rotating in the forward direction provides an increased rotational speed of the output shaft of the carrier 36, 46 of that planetary gear configuration 30, 40, and the ring gear 48, 38 rotating in the backward direction provides a corresponding decreased rotational speed of the output shaft of the carrier 46, 36 of that planetary gear configuration 40, 30.

For example, if the ring gear 38 of the first planetary gear configuration 30 rotates in the forward direction, providing an increased rotational speed of the output shaft of carrier 36, the ring gear 48 of the second planetary gear configuration 40 rotates in the backward direction, providing a decreased rotational speed of the output shaft of carrier 46.

The sum of the rotational speed of the output shaft of the respective carrier 36, 46 is constant for a constant rotational speed of the motor, independent of which ring gear 38, 48 rotating in the forward or backward direction, rotational speed of the respective ring gear or if the ring gears are locked, i.e. not rotating such that output shaft of the respective carrier 36, 46 rotates in the same rotational speed.

For example, if the rotational speed of the motor is 3000 rpm, in the case when the ring gears are at stand still, the respective carrier 36, 46 rotates in the same rotational direction at 1000 rpm, the sum being 2000 rpm, and in the case when the first ring gear rotates at a certain rotational speed in the forward direction and the second ring gear rotates at the same rotational speed in the backward direction, carrier 36 rotates in the forward direction at e.g. 1100 rpm, carrier 46 will rotate in the forward direction at 900 rpm.

As schematically illustrated in FIG. 2 said reversing assembly 22 comprises a first gear 26 in mesh with the ring gear 38 of the first planetary gear configuration 30, a second gear 27 in mesh with the ring gear 48 of the second planetary gear configuration 40 and a third gear 28 connected to the second gear 27 via said shaft configuration 24 constituted by a shaft 24a, and in mesh with the first gear 26, said first gear 26 and third gear 28 providing said rotational change configuration 25, so as to change rotational direction. The second and third gears 26, 27 are thus fixedly connected to the shaft 24a such that they rotate with the same rotational speed.

Figure 4:
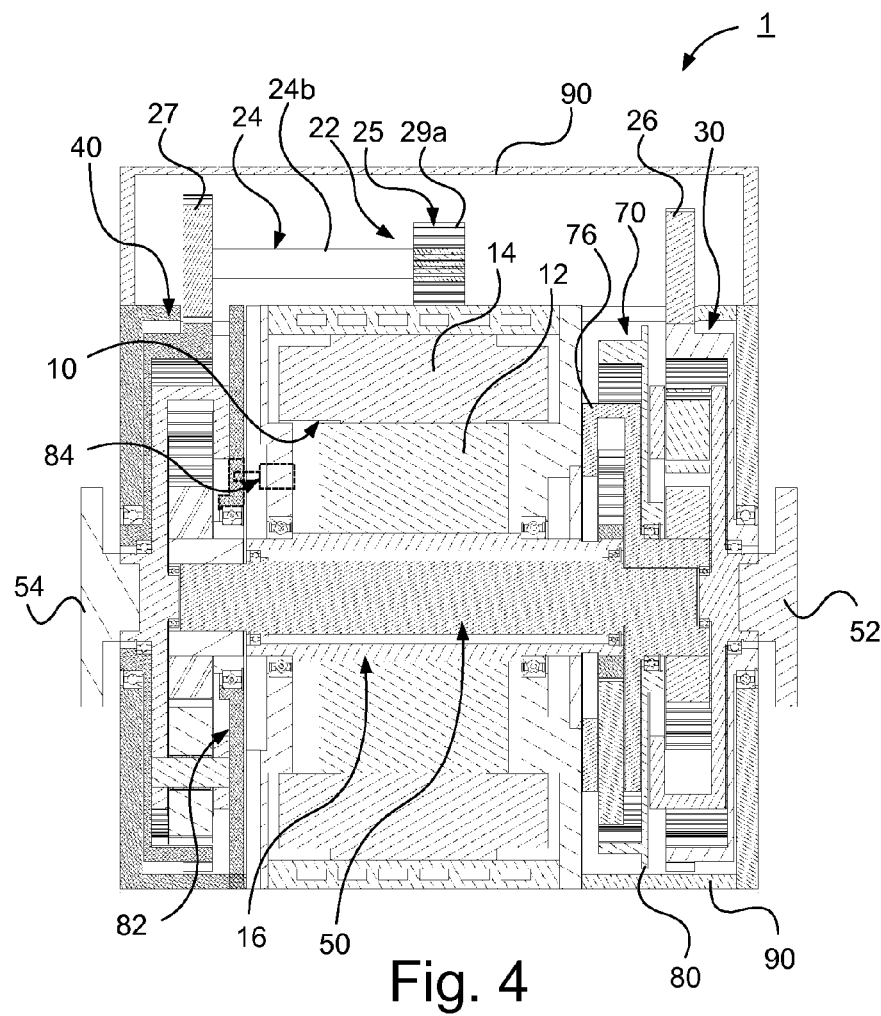
FIG. 4 schematically illustrates an electric drive system according to an embodiment of the present invention.

Alternatively, as may be partly seen from FIG. 4, said reversing assembly 22 may instead of said third gear comprise a fourth gear (not shown) connected to the first gear 26 via a first differential shaft (not shown), and a fifth gear 29a connected to the second gear 27 via a second differential shaft 24b, wherein the fourth and the fifth gears are in mesh with each other, said fourth and fifth gear providing said rotational change configuration 25, so as to change rotational direction such that the rotational direction of the first differential shaft with the fourth gear is opposite to the rotational direction of the second differential shaft 24b with the fifth gear 29a. The shaft configuration 24 is according to this embodiment constituted by the first and second differential shafts.

In the differential means 20 the input power from the motor 10 is transferred to the sun gear 32, 42 of the first and second planetary gear configuration 30, 40, wherein in the output power is transferred from the shaft of the carrier 36, 46 of the first and second planetary gear configuration 30, 40 respectively to the respective output assembly 52, 54.

The differential means 20 may be an open differential, i.e. the ring gear 38 of the first planetary gear configuration 40 and the ring gear 48 of the second planetary gear configuration 40 rotate in opposite rotational directions when final drive is subjected to different rotational speeds, e.g. when the final drive is connected to wheels of a vehicle and said vehicle is turning, i.e. driving in a curve.

Figure 3A:
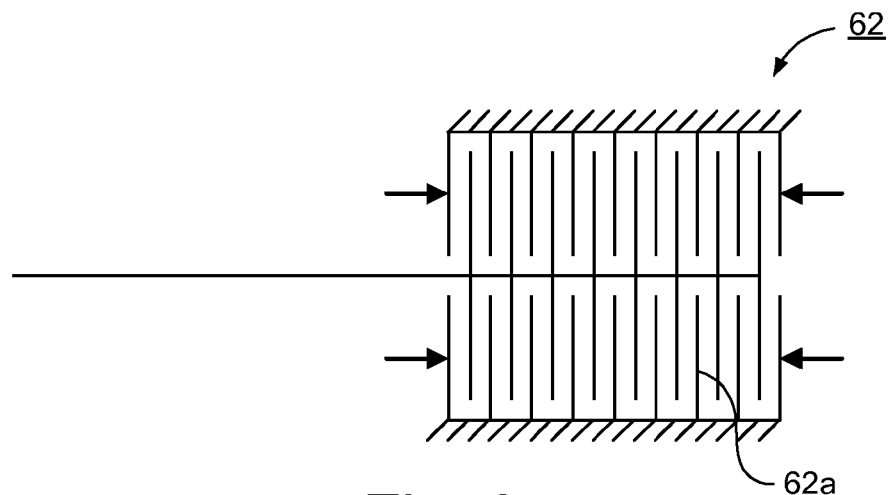
FIG. 3a-c schematically illustrates different embodiments of means for controlling differential configuration according to the present invention.
Figure 3B:
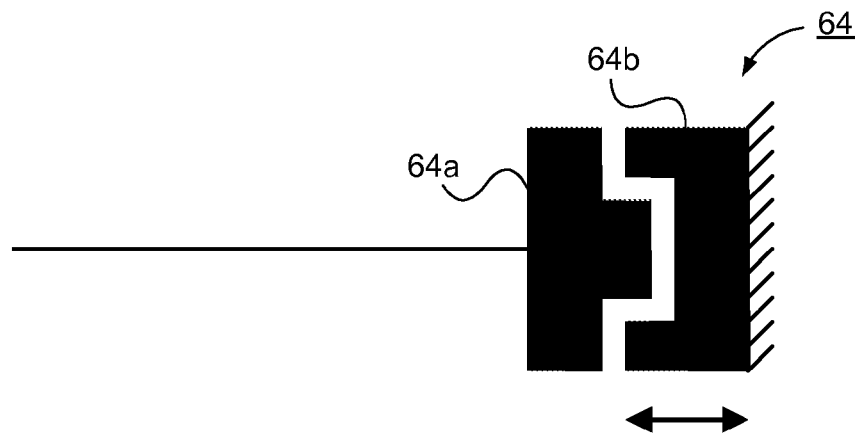
Figure 3C:
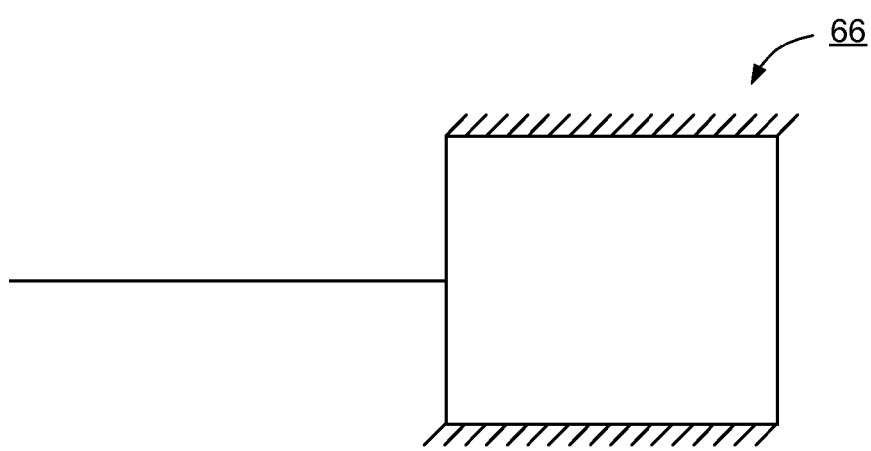

As is shown in FIG. 3a-c the differential means 20 may comprise any suitable control means 60 for controlling the differential means 20. Said control means 60 may as is shown in dotted lines in FIG. 2 be arranged in connection to the first gear 26, the second gear 27 or the third gear 28 for controlling the differential means 20.

FIG. 3a schematically illustrates control means represented by a coupling configuration 62 being constituted by a multiple disc brake member 62 having a set of discs 62a for providing a braking action when subjected to a pressure, said multiple disc brake member 62 being operable to engage said reversing assembly 22 so as to facilitate control of said differential means 20.

By means of a multiple disc brake member 62 control of degree of braking is facilitated. Said multiple disc brake member 62 when activated provides a fully locked operating state during engagement of said reversing assembly 22, in which a total differential lock is provided such that first and second output assemblies 52, 54, e.g. final drives are locked to the same rotational speed, such that e.g. opposite wheels of a vehicle are forced to rotate with the same rotational speed.

Said multiple disc brake member 62 further provides when activated a limited-slip operating state during engagement of said reversing assembly 22, wherein the differential means 20 is controlled such that a difference in rotational speed between the output assemblies 52, 54, e.g. final drives, e.g. opposite wheels of a vehicle, is required in order for the differential means 20 to lock. Hereby prevention of relative wheel movement is provided by means of difference in rotational speed.

FIG. 3b schematically illustrates control means represented by a coupling configuration 64 being constituted by a mechanical coupling 64, e.g. a dog-clutch 64 having a first element 64a and a second element 64b being shaped such that they when brought together are engaged such that mutual rotational movement is prevented. Said mechanical coupling 64 is operable to engage said reversing assembly 22 so as to facilitate control of said differential means 20. Said dog-clutch provides a fully locked state according to above when operated to engage said reversing assembly 22, and a fully unlocked state when not activated, providing an open differential according to above.

FIG. 3c schematically illustrates a control means constituted by a motor 66, e.g. an electric motor or a hydraulic motor, operable to engage said reversing assembly 22 so as to facilitate control of said differential means 20. Said motor 10 provides torque-vectoring when operated to engage said reversing assembly 22, such that power from one output assembly 52, 54, e.g. final drive, e.g. wheel of vehicle, is transferable to the other output assembly, e.g. final drive, e.g. wheel of vehicle. For example, when driving with a vehicle in a curve power from the inner wheel is transferred to the outer wheel. This function may be used for controlling the vehicle, e.g. steering of the vehicle.

The electric drive system 1 also comprises transmission means 70, said transmission means 70 comprising a drive planetary gear configuration 70. The drive planetary gear configuration 70 is in driving engagement with said rotor 12 shaft, said drive planetary gear configuration 70 being drivingly connected to said output shaft 50.

The drive planetary gear configuration 70 is arranged between the first and second planetary gear configurations 30, 40.

The drive planetary gear configuration 70 includes a sun gear 72, a planet gear set 74 supported by a carrier 76, and a ring gear 78. In the drive planetary gear configuration 70, the sun gear 72 is in mesh with the planet gear set 74, and the planet gear set 74 is in mesh with the ring gear 78.

The sun gear 72 of the drive planetary gear configuration 70 is constituted by a gear fixedly mounted on the drive shaft 16 and thus arranged to rotate with the same rotational speed as the drive shaft 16.

The carrier 76 of the drive planetary gear configuration 70 is fixedly connected to the output shaft 50 and thus arranged to rotate with the same rotational speed as the output shaft 50.

The transmission means, i.e. the drive planetary gear configuration 70, comprises means for providing change in rotational speed of said output shaft 50. Said means comprises a first coupling assembly 80 operable to engage, i.e. releasably lock, the ring gear 78 and a second coupling assembly 82 operable to engage, i.e. releasably lock, said output shaft 50 to said drive shaft 16. Said first coupling assembly 80 is arranged on one side, here the right side, of the motor 10, and the second coupling assembly 82 is arranged on the opposite side, here the left side, of the motor 10.

The ring gear 78 of the drive planetary gear configuration 70 is according to the invention operable to engage, i.e. releasably lock, to a housing 90 or other load-supporting member of the electric drive system 1. Said first coupling assembly 80 is thus operable to engage said ring gear 78 to said housing 90 such that in an engaged state the ring gear 78 is prevented from rotating and in disengaged state the ring gear 78 is allowed to rotate.

Said second coupling assembly 82 is operable to engage, i.e. releasably lock, said output shaft 50 to said drive shaft 16, such that in an engaged state the output shaft 50 is allowed to rotate with the same rotational speed as the drive shaft 16 and in a disengaged state the output shaft 50 is allowed to rotate relative to the drive shaft 16.

The carrier 76, and thus the sun gear 72, planet gear set 74 and ring gear 78 of the drive planetary gear configuration 70, is in this embodiment arranged on the right side of the motor 10 and the second coupling assembly 82 is arranged on the left side of the motor 10. By this arrangement a more compact electric drive system 1 is facilitated, which is explained in more detail with reference to the embodiment in FIG. 4-7 disclosing an embodiment of the second coupling assembly 82.

The transmission means, i.e. the drive planetary gear configuration 70, thus provides for different operational states.

In the first operational state the ring gear 78 is in the engaged or locked state and output shaft 50 in disengaged or unlocked state, such that a ratio between the drive shaft 16 and the output shaft 50 is provided, the output shaft 50 rotating with a reduced rotational speed relative to the drive shaft 16.

Hereby a higher torque is provided by the output shaft 50. This is the referred to as the low transmission state.

In the second state the ring gear 78 is in a disengaged state and the output shaft 50 is in the disengaged or unlocked state, such that the rotational speed of the motor 10/drive shaft 16 may be freely regulated relative to the output shaft 50.

In the third state the ring gear 78 is in the disengaged or unlocked state and the output shaft 50 is in the engaged or locked state, such that the output shaft 50 and the drive shaft 16 rotates with the same rotational speed. Hereby a lower torque is provided by the output shaft 50. This is referred to as the high transmission state.

In the fourth state the ring gear 78 is in the engaged or locked state and the output shat is in the engaged or locked state, such that drive is prevented, wherein according to an embodiment the parking brake is activated.

The drive planetary gear configuration 70 is referred to as a high/low-planetary gear configuration.

FIG. 4-7 schematically illustrates an embodiment of the electric drive system 1 wherein the operation of the transmission means, i.e. the drive planetary gear configuration 70, of the present invention is described in more detail.

FIG. 4 schematically illustrates an embodiment of the electric drive system 1. The electric drive system 1 comprises a housing 90. The electric drive system 1 further comprises, as described with reference to FIG. 2, an electric motor 10 having a rotor 12 and a stator 14, said rotor 12 being connected to a drive shaft 16, said rotor 12 being arranged to rotate said drive shaft 16, and an output shaft 50 rotatable relative to and substantially aligned with said drive shaft 16. Said drive shaft 16 is a hollow drive shaft 16 and said output shaft 50 is extending through said drive shaft 16.

The electric drive system 1 further comprises differential means 20 having a first planetary gear configuration 30 and a second planetary gear configuration 40 as described with reference to FIG. 2. The differential means 20 further comprises a reversing assembly 22 as described above under FIG. 2 referring to FIG. 4. The reversing assembly 22 comprises a rotational direction change configuration 25. The differential means 20 functions as described with reference to FIG. 2.

The electric system further comprises a drive planetary gear configuration 70 as described with reference to FIG. 2. The drive planetary gear configuration 70 thus includes a sun gear 72, a planet gear set 74 supported by a carrier 76, and a ring gear 78. In the drive planetary gear configuration 70, the sun gear 72 is in mesh with the planet gear set 74, and the planet gear set 74 is in mesh with the ring gear 78.

The drive planetary gear configuration 70, comprises means for providing change in rotational speed of said output shaft 50.

Said means for providing change in rotational speed comprises a first coupling assembly 80 operable to engage, i.e. releasably lock, the ring gear 78 to the housing 90, said first coupling assembly 80 comprising according to this embodiment a friction coupling here illustrated as a flange for locking said ring gear 78. Said first coupling assembly 80 may comprise any suitable coupling such as friction coupling or multiple disc clutch.

Said means for providing change in rotational speed also comprises a second coupling assembly 82 operable to engage, i.e. releasably lock, said output shaft 50 to said drive shaft 16, said second coupling assembly 82 comprising a gear clutch 82a and a shifting arm 82b configured to shift said gear clutch for said engagement/locking.

Any type of suitable coupling means could be used. According to an alternative embodiment the second coupling assembly 82 comprises, instead of a shifting arm, a piston, which is shown with dotted lines in FIG. 4. Hereby the shifting arm 82b is arranged to shift the gear clutch 82a for said engagement/locking. A piston 84 and possible element for assisting in moving said gear clutch may as seen by the dotted lines take up less space than the shifting arm, and may thus reduce weight.

Instead of a gear clutch any suitable coupling may be used such as a synchronizing drum, a dog-clutch or a disc clutch.

The sun gear 72, planet gear set 74 and carrier 76, the ring gear 78 and the first coupling assembly 80, e.g. said friction coupling for engaging/locking the ring gear 78, is arranged on the right side of the motor 10 in FIG. 4, and the second coupling assembly 82, i.e. the gear clutch 82a and shifting arm 82b is arranged on the opposite side of the motor 10.

The ring gear 78 is journalled in the housing 90 so as to facilitate neutral position of the transmission means, i.e. the drive planetary gear configuration 70. As the ring gear 78 is journalled it may rotate when the transmission means 70 is locked. Thus, when the second coupling assembly is locked the ring gear 78 will to rotate.

The output shaft 50 is fixedly connected to the sun gear 72 of the drive planetary gear configuration 70. The output shaft 50 is further fixedly connected on respective side of the motor 10 to the sun gear 32, 42 of the first and second planetary gear configuration 40 respectively, the power transferred from the drive planetary gear configuration 70 thus being divided on the first and second planetary gear configuration 40, receiving the same power on its respective sun gear 32, 42.

Figure 5:
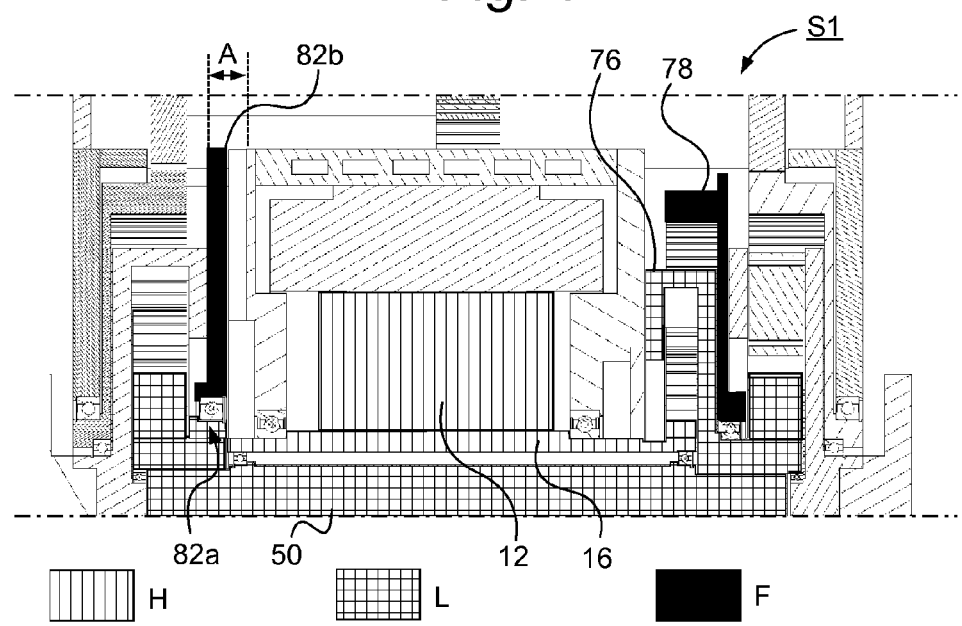
FIG. 5-7 schematically illustrates different states of operation of a planetary gear configuration according to an embodiment of the present invention.
Figure 6:
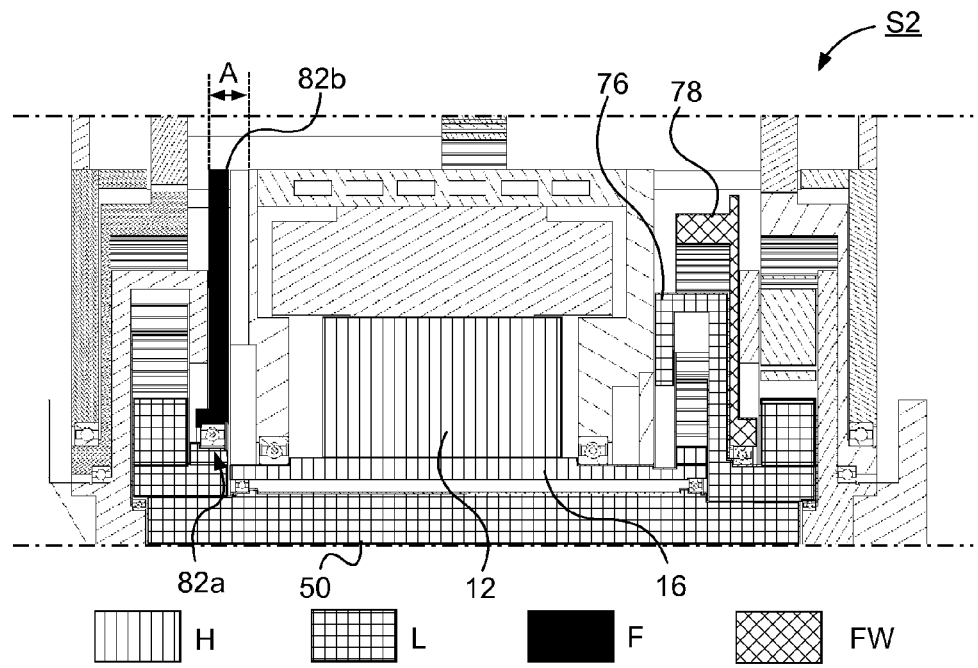
Figure 7:
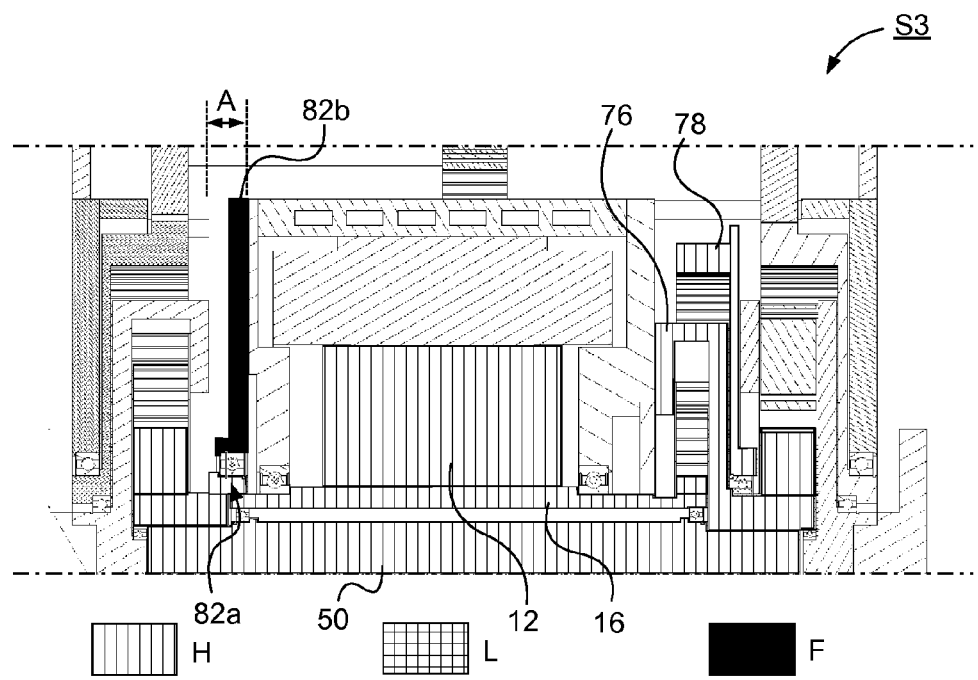

FIG. 5-7 schematically illustrates different states of operation S1, S2, S3 of the drive planetary gear configuration 70 according to an embodiment of the present invention. In FIG. 5-7 the components rotating with a reduced speed L are illustrated with a checked pattern, the components rotating with the rotational speed of the motor 10, i.e. high rotational speed H, are illustrated with vertical stripes, and components being fixed F are illustrated as black/filled.

FIG. 5 schematically illustrates the first operational state S1, i.e. the low transmission state, in which the first coupling assembly 80 is activated causing the ring gear 78 to be engaged, i.e. locked by means of said first coupling assembly 80, i.e. in this embodiment said flange.

The output shaft 50 is in a disengaged state, i.e. an unlocked state such that the output shaft 50 is allowed to rotate relative to the drive shaft 16. Thus, the shifting arm 82b has been activated to cause the gear clutch to be engaged to the output shaft 50 and is positioned such that the gear clutch is engaged/connected to the output shaft 50 and thus in a position to the left in the area of arrow A.

Hereby a ratio between the drive shaft 16 and the output shaft 50 is provided, the output shaft 50 rotating with a reduced rotational speed relative to the drive shaft 16, providing a higher torque.

FIG. 6 schematically illustrates the second operational state S2 in which the ring gear 78 is in a disengaged state, i.e. the first coupling assembly 80 is disengaged, such that the ring gear 78 is allowed to rotate. The disengaged state of the ring gear 78 is illustrated with a cross-striped pattern.

The output shaft 50 is in an unlocked state, i.e. the shifting arm 82b is positioned such that the gear clutch is engaged/connected to the output shaft 50 and thus in a position to the left in the area of arrow A, such that the output shaft 50 is allowed to rotate relative to the drive shaft 16.

Hereby the drive planetary gear configuration 70 is in a neutral position, such that the rotational speed of the motor 10/drive shaft 16 may be freely regulated relative to the output shaft 50. Thus, the rotational speed of the motor 10 may be regulated independently of the rotational speed of output shaft 50 and possible wheels, which thus is used for synchronization prior to shifting to the high transmission state.

FIG. 7 schematically illustrates the third state S3, i.e. the high transmission state. In the third operational state the output shaft 50 is in the engaged/locked state, i.e. the shifting arm 82b has been activated to cause the gear clutch to engage the output shaft 50 and the drive shaft 16. The shifting arm 82b is thus positioned such that the gear clutch engages/connects the drive shaft 16 and the output shaft 50, said shifting arm 82b thus being in a position to the right in the area of arrow A, such that the output shaft 50 is allowed to rotate with the same rotational speed as the drive shaft 16 and thus together with the drive shaft 16.

Hereby the low transmission state is bypassed, i.e. the ring gear 78 of the drive planetary gear configuration 70 is arranged in relation to the first coupling assembly 80 and configured such that when the sun gear 72 and the planet gear set 74 are fixedly engaged relative to each other, the ring gear 78 will be in the disengaged/unlocked state. Thus activation of the second coupling assembly 82 causes the first coupling assembly 80 to disengage such that the rotational speed of the output shaft 50 coincides with the rotational speed of the drive shaft 16. Hereby a lower torque is provided by the output shaft 50.

The fourth state mentioned with reference to FIG. 2 is not shown here.

Figure 8:
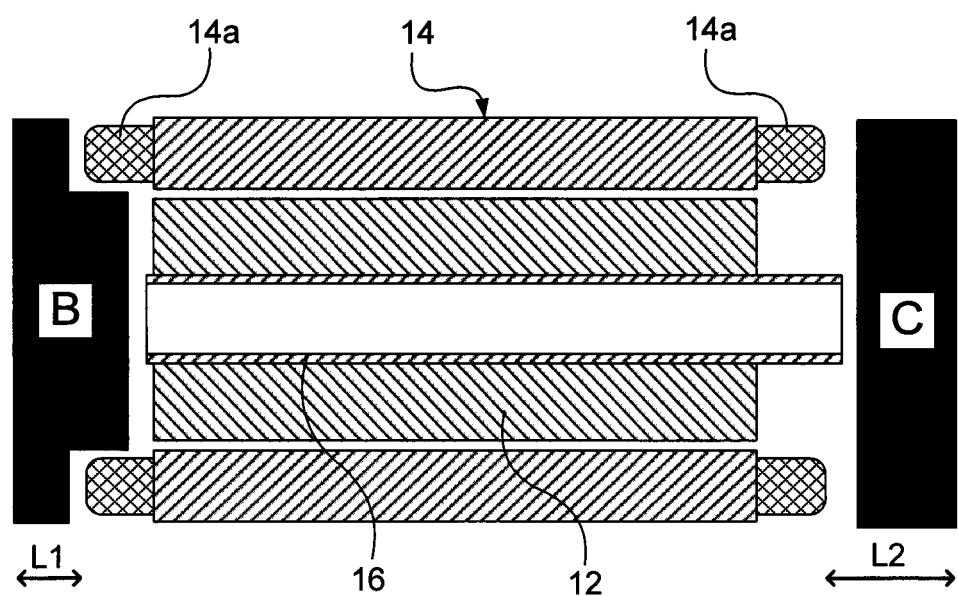
FIG. 8 schematically illustrates details of an electric motor and drive shaft of the electric drive system according to an embodiment of the present invention.

FIG. 8 schematically illustrates details of an electric motor 10 and drive shaft 16 of the electric drive system 1 according to an embodiment of the present invention illustrating space occupation, and provides an explanation why the division of first and second coupling assembly 82 on the respective side of the motor 10 as described above provides/facilitates a more compact electric drive system 1.

The shaded area B on the left side illustrates the space available when the second coupling assembly 82, e.g. the shifting arm 82b and gear clutch 82a, is disposed on the left side of the motor 10 and the first coupling assembly 80, the sun gear 72, planet gear set 74 with carrier 76 and ring gear 78 of the drive planetary gear configuration 70 is disposed on the opposite side, in accordance with the present invention. The arrow L1 on the left side illustrates the space in the axial direction outside of the protruding windings needed for the second coupling assembly.

The shaded area C on the right side illustrates the space occupied if the second coupling assembly 82, e.g. the shifting arm 82b and gear clutch, and the first coupling assembly 80, the sun gear 72, planet gear set 74 with carrier 76 and ring gear 78 of the drive planetary gear configuration 70 is disposed on the same side of the motor 10, thus occupying more space in the longitudinal/axial direction of the electric drive system 1. The arrow L2 on the right side illustrates the space in the axial direction outside of the protruding windings needed if the second coupling assembly should be arranged on the right side with the rest of the drive planetary gear configuration 70.

The electric motor 10 comprises rotor 12, a hollow drive shaft 16 arranged to rotate with the motor 10 with the same rotational speed, as mentioned above. The electric motor 10 further comprises a stator 14 having a winding 14a extending on each side in the axial direction and thus occupies space in the housing of the electric drive system 1.

The carrier 76 of the planet gear set 74 occupies space and the shaft of the carrier 76 is arranged to extend away from the motor 10, and since the carrier 76 is arranged to rotate, and thus rotates during operation, it is not possible to arrange the second coupling assembly 82, e.g. shifting arm 82b and gear clutch, on that side of the carrier 76.

Arranging the second coupling assembly 82, e.g. shifting arm 82b and gear clutch, on the opposite side of the carrier 76, i.e. between the motor 10 and the carrier 76 results in the shifting arm 82b and gear clutch ending up outside of the level of the protruding windings 14a since the diameter of the drive shaft 16 will be larger at the coupling position. The output shaft 50 has an extension portion on the right side so as to facilitate attachment of the sun gear 72 thereon. Thus, more space in the axial direction is required as compared to the preferred solution according to the present invention, i.e. dividing the first and second coupling on the respective side of the motor 10.

The electric drive system 1 according to the present invention with the differential means 20 separated from the drive shaft 16 and the transmission means facilitates separation of high/low-drive and differential drive.

The electric drive system 1 according to the present invention with the differential means 20 separated from the drive shaft 16 and the transmission means facilitates differential lock as described with reference to FIG. 3a-b and facilitates toque vectoring as described above with reference to FIG. 3c.

The electric drive system 1 according to the present invention with the differential means 20 separated from the drive shaft 16 and the transmission means may advantageously be combined with power electronics, electronic control unit, hybrid drive, diesel electric drive etc.

The electric drive system 1 according to the present invention with the differential means 20 separated from the drive shaft 16 and the transmission means may comprise cooling of electric motor 10 and gears, lubrication of gears, and resolvers for determining rotating parts.

The electric drive system 1 according to the present invention with the differential means 20 separated from the drive shaft 16 and the transmission means may be housed in a housing 90 as mentioned with reference to e.g. FIG. 4, wherein said electric drive system 1 may be integrated to a drive shaft 16 of motor 10 driven unit such as a motor 10 vehicle. The drive shaft 16 may be rigidly suspended, pendulum suspended, damped etc.

The electric drive system 1 according to the present invention may longitudinally arranged in a four wheel drive power train.

The electric drive system 1 according to the present invention with the differential means 20 separated from the drive shaft 16 and the transmission means may be used for providing pivot turns, when using control means constituted by a motor, and low gear.

The electric drive system 1 according to the present invention with the differential means 20 separated from the drive shaft 16 and the transmission means may be used for traction control, when using control means constituted by a motor, and low gear.

Above sun gear 72, planet gear set 74 and carrier 76, ring gear 78, and first coupling assembly 80 for locking the ring gear 78 of the drive planetary gear configuration 70 of the electric drive system 1 is disposed on right side of the electric motor 10 and the second coupling assembly 82 drive planetary gear configuration 70 is disposed on left side of the electric motor 10. Of course it could be the opposite way around.

The electric drive system comprises sensor means for determining speed of output shafts of the respective carriers 36, 46. Said sensor means may be arranged at any suitable location. Said sensor means is according to an embodiment a resolver for the respective carrier 36, 46.

The electric drive system comprises means for determining the rotor shaft speed and position. Said rotor shaft speed/position determining means may be constituted by a sensor member such as a resolver.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. An electric drive system comprising:
   an electric motor arranged to rotate a drive shaft;
   a drive planetary gear configuration being in driving engagement with said drive shaft and an output shaft rotatable relative to said drive shaft; and
   gear assemblies for providing change in rotational speed of said output shaft,
   wherein said gear assemblies are disposed on opposite sides of the motor respectively,
   the output shaft is extended through the drive shaft so as to run inside the drive shaft and connected to the drive planetary gear configuration outside the drive shaft, and
   said gear assemblies are operable between a first state in which the output shaft rotates with a slower rotational speed than the drive shaft, a second freewheeling state, a third state in which the output shaft and the drive shaft rotate with the same rotational speed, and a fourth fully lockup-state in which drive is prevented.

2. An electric drive system according to claim 1, wherein said output shaft is substantially aligned with said drive shaft.

3. An electric drive system according to claim 1, wherein said gear assemblies comprise a first coupling assembly operable to engage a ring gear of the drive planetary gear configuration.

4. An electric drive system according to claim 1, wherein said gear assemblies comprise a second coupling assembly operable to engage the drive shaft to the output shaft, said second coupling assembly being disposed on the opposite side of the motor to a first coupling assembly.

5. An electric drive system according to claim 4, wherein said second coupling assembly comprises a shifting arm configuration.

6. An electric drive system according to claim 4, wherein said second coupling assembly comprises a piston.

7. An electric drive system according to claim 1, further comprising a differential member comprising a first planetary gear configuration being drivingly connected to a first output assembly; a second planetary gear configuration being in driving engagement with said first planetary gear configuration via said output shaft, said second planetary gear configuration being drivingly connected to a second output assembly; said motor being disposed between said first and second planetary gear configurations, said first planetary gear configuration being arranged to co-act with said second planetary gear configuration so as to provide a differential function.

8. An electric drive system according to claim 7, wherein said drive planetary gear configuration is disposed between said first and said second planetary gear configurations.

9. An electric drive system according to claim 7, wherein ring gears of the first and second planetary gear configurations are engaged via a reversing assembly for said differential function.

10. An electric drive system according to claim 9, wherein said reversing assembly comprises a shaft configuration separated from said drive shaft.

11. An electric drive system according to claim 9, wherein said reversing assembly comprises a rotational direction change configuration, connected to the ring gears of the first and second planetary gear configurations via said shaft configuration.

12. An electric drive system according to claim 9, further comprising a control member being operable to engage said reversing assembly for controlling said differential member.

13. An electric drive system according to claim 12, wherein said control member comprises a coupling configuration for braking said reversing assembly.

14. An electric drive system according to claim 12, wherein said control member comprises a motor.

15. A motor driven unit comprising an electric drive system according to claim 1.

16. An electric drive system according to claim 1, wherein the electric motor comprises a rotor and a stator, and the drive shaft is disposed inside the rotor.

* * * * *